United States Patent Office 2,986,617
Patented May 30, 1961

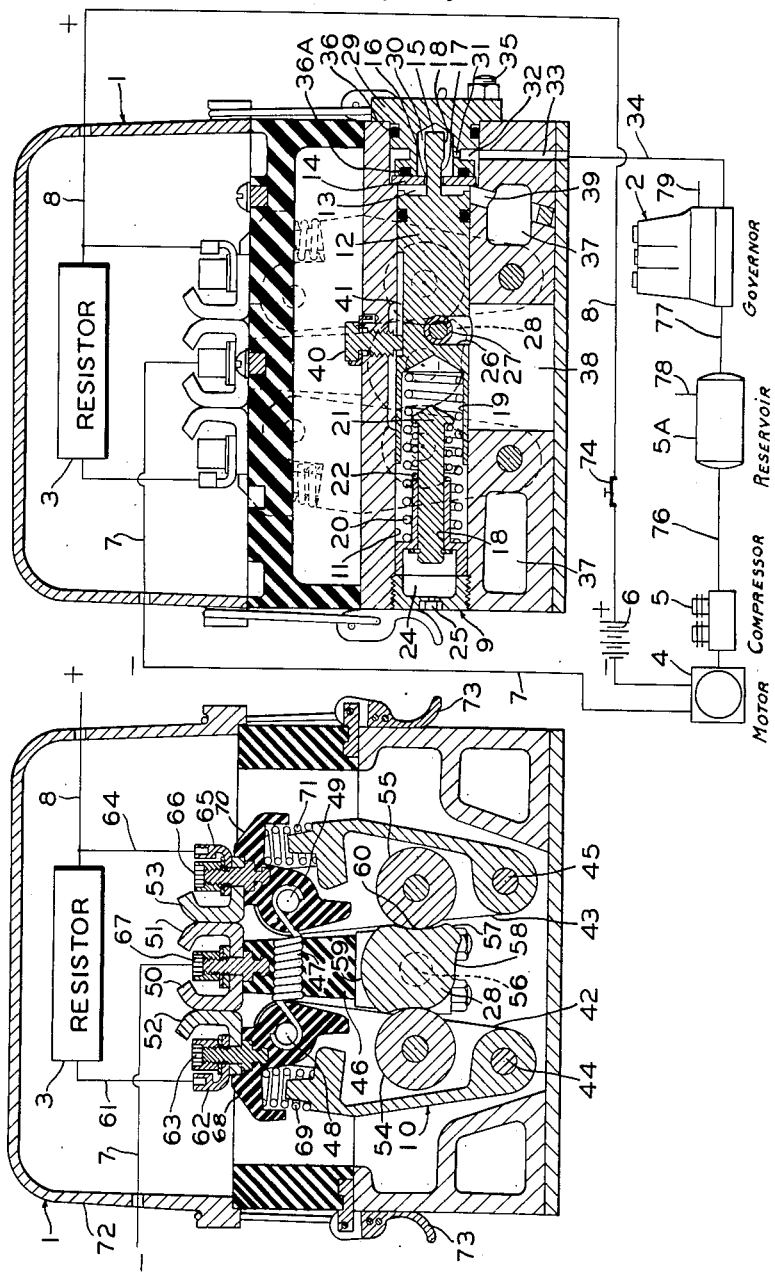
May 30, 1961     F. W. SHIREY     2,986,617
FLUID COMPRESSOR MOTOR CONTROL APPARATUS
Filed March 16, 1959
*INVENTOR.*
FRANK W. SHIREY
BY
Adelbert A. Steinmiller
*ATTORNEY*

2,986,617

FLUID COMPRESSOR MOTOR CONTROL APPARATUS

Frank W. Shirey, Irwin, Pa., assignor to Westinghouse Air Brake Company, Wilmerding, Pa., a corporation of Pennsylvania Filed Mar. 16, 1959, Ser. No. 799,630

12 Claims. (Cl. 200—82)

This invention relates to fluid compressor motor control apparatus and more particularly to direct current motor control apparatus for fluid compressors in which the compressor remains loaded under starting conditions.

It is currently the practice in fluid compressor motor control apparatus to start the compressor under load with no starting resistance in the armature circuit of the direct current compressor motor. This practice results in a high current surge of a harmful nature in the motor armature circuit while the motor is starting, as a result of which, armature windings of large current-carrying capacity are required for motors driving compressors of fluid compressor systems. The motor control apparatus proposed herein provides a novel means for inserting a starting resistance in the armature circuit of a compressor motor during starting to limit the motor starting current to safe values and a novel means for delaying shunting of the resistance until the compressor motor has attained a normal working speed, thereby elimininating the need for extra large capacity motor windings.

According to the invention, there is provided a fluid pressure operated switch device having a self-cleaning, triple capacity choke utilized for properly timing the operation of the switch device for effecting insertion and shunting of a starting resistance in the armature circuit of a direct current motor. The triple capacity choke comprises a plunger of varying diameter on the end of a fluid pressure controlled switch operating piston and movable in the orifice for sequentially venting a chamber on one side of the operating piston at different rates. The variations in the rate of venting of the chamber effected by the triple capacity choke causes corresponding variation in the speed of movement of the operating piston which in turn controls the speed of rotation of a cam to effect operation of cam operated switch members to control the removal of a starting resistance in a direct current motor circuit in timed sequence.

In the accompanying drawings, Fig. 1 is a diagrammatic view of a fluid pressure compressor system including an enlarged sectionalized view of the motor control device utilized therein. Fig. 2 is a sectionalized view of the motor control device of Fig. 1, showing additional details of structure thereof.

Description

Referring to Fig. 1, the fluid compressor motor control apparatus includes a control switch device 1 utilized in cooperation with a standard compressor governor 2 to insert a starting resistor 3 in the armature circuit of a direct current motor 4 for driving the compressor 5 which charges a reservoir 5a. The armature circuit of said motor includes a suitable source of direct current voltage, represented by a battery 6, a negative wire 7 and a positive wire 8. The compressor governor shown in outline is similar to that disclosed in U.S. Patent 1,615,365 (assigned to the assignee of this application) and adapted for a single control passage connection between the governor and the control switch device.

For simplicity of description the control switch device 1 is illustrated in two portions, the sectionalized piston portion 9 shown in Fig. 1 and the sectionalized contact member portion 10 shown in Fig. 2.

The piston portion 9 of the control switch 1 comprises approximately one half of the lower part of the switch device 1 and includes a cylindrical bore 11 having an operating piston 12 slidably positioned within said bore to form a chamber 13 with a choke plate 14 at one end (hereinafter referred to as the right end) of the piston 12.

A plunger 15 is attached to the right end of the piston to extend through both the chamber 13 and an orifice 16 in the choke plate 14 when the piston 12 is in its right-hand position. The plunger 15 is formed with two different diameters, a small diameter section 17 and a large diameter section 18 at the outer extremity thereof.

The left end of the piston 12 has a spring recess 19 for receiving a piston spring 20, a buffer piston 21 and a buffer spring 22. The buffer piston 21 is slidably positioned in a bore 23 and extends into a dampening chamber 24 which is vented to atmosphere through a choke 25.

Midway in the piston 12 is a vertical recess or slot 26 adapted to receive an eccentric pin 27 which is suitably attached to a switch cam 28 such that horizontal movement of the piston 12 effects rotary movement of the cam 28.

The choke plate 14 at the right end of the chamber 13 is maintained in position by an end cap 29 having a chamber 30 for receiving the plunger 15. A choke 31 establishes communication with chamber 30 and a chamber 32 which is connected by a passage 33 to a pipe 34 which is connected to the governor 2. The end cap 29 is secured by bolts 35 with suitable O-type sealing rings 36 positioned where needed on the end cap and on the piston 12. An inner flange on the end cap is provided with an annular groove therein in which is contained a friction O-ring 36a which presses against the choke plate 14 to hold it in position yieldingly in a manner to enable appropriate shifting of the plate in its own plane responsively to movement of the plunger 15 in the left-hand direction through the orifice 16. The orifice in the choke plate is thus automatically kept in alignment with the plunger.

An annular operating volume 37 is formed in the piston portion 9 around a center space 38, said volume being connected to chamber 13 by a passage 39.

A thumb screw 40 is suitably fixed in the piston portion 9 to extend into a guide slot 41 on the piston 12 to limit the horizontal motion of the piston 12.

The contact member portion 10 (Fig. 2) comprises two contact arms 42 and 43, pivotally mounted on pivot pins 44 and 45 and biased inwardly toward a rigidly mounted contact member 46 by a spring 47 connected at opposite ends to pins 48 and 49 secured respectively to the contact arms. The contact member 46 has a pair of contacts 50 and 51, while the contact arm 42 has a single contact 52 engageable with contact 50, and the contact arm 43 has a single contact 53 engageable with the contact 51.

A pair of cam followers 54 and 55, in the form of rollers rotatably mounted on pins secured to the contact arms 42 and 43 respectively, cooperatively ride on opposite sides of the cam 28. The cam 28 is secured to the contact member 46 by a pin 56 and adapted to be rotated about the pin 56 when the cam is rotated by the attached eccentric pin 27 (shown in Fig. 1).

The cam 28 has a plurality of action surfaces as follows: a first high surface 57 near the eccentric pin 27 engageable with the cam follower 54 to maintain the contact 52 disengaged from contact 50; a first low surface 58 engageable with the cam follower 54 to permit contact 52 to engage contact 50; a second high surface 59 engageable with cam follower 55 to maintain contact 53 disengaged from contact 51; and a second low surface 60 engageable with cam follower 55 to permit contact 53 to engage contact 51.

A branch wire 61 is connected from the starting resistor 3 to a lug 62 which is attached to the contact 52 by suitable thumb screw means 63. A branch wire 64 is connected from the positive wire 8 to a lug 65 which is attached to contact 53 by suitable thrumb screw means 66. The negative wire 7 is connected to a lug (not shown) similar to the lugs 62 and 65, said lug being attached to both contacts 50 and 51 by a suitable thumb screw means 67.

The contact 52 is also attached to a maintaining bracket 68 which pivots about the pin 48 against the force of a spring 69 to insure firm engagement between the contacts 52 and 50. The contact 53 is similarly mounted on a mounting bracket 70 pivoting about pin 49 against the force of a spring 71.

In order to prevent dirt from entering the contact mechanism, a cover 72 is placed over the contact arms, and associated assemblage, and maintained in place by snap clips 73.

A manually operated switch 74 is connected in the motor armature circuit to be utilized to initially condition the motor circuitry for operation.

*Operation*

To initially start the compressor 5, the switch 74 is first closed. The control switch device 1 is initially in the position shown in Fig. 1 and Fig. 2 with the operating piston 12 in its extreme right-hand position as shown in the drawings and the contacts 52 and 53 engaging contacts 50 and 51 respectively. When contact 52 engages contact 50, a starting resistance circuit is completed from the motor 4, the negative wire 7, contact 50 via the screw means 67, contact 52, lug 62, branch wire 61, starting resistor 3 and positive wire 8 to the battery 6 and thence to the motor 4. When contact 53 engages contact 51, a shunting circuit is completed for shunting the starting resistor 3 by way of motor 4, the negative wire 7, screw means 67, contact 51, contact 53, lug 65, branch wire 64 and positive wire 8 to the battery 6 and thence to the motor 4.

Being that there is no fluid under pressure in the reservoir 5a to be supplied via pipe 76, the governor 2 will act to connect the reservoir 5a via pipe 77 through the governor 2 to the pipe 34 to effect supply of fluid under pressure to the chamber 13 as hereinafter described.

It should be noted that for a very brief interval of time the starting resistance 3 is shunted by the shunting circuit on the initial starting of compressor operation, although no harm is derived therefrom in that there is no load at all on the compressor and the time period of this shunting is only a matter of one or two seconds.

As the compressor continues to run, fluid under pressure builds up in the reservoir 5a and likewise in chamber 13 of the piston portion via pipe 34, passage 33, chamber 32, choke 31, chamber 30 and orifice 16. As pressure builds up in chamber 13, fluid pressure in the operating volume 37 also builds up, since this volume 37 is connected to chamber 13 by passage 39. The build-up of pressure in chamber 13 is very rapid due to the high initial speed of the compressor operating with the starting resistor 3 shunted for several seconds by the previously-described shunting circuit. With the rapid build-up of pressure in chamber 13, the piston 12 begins to move to the left (as shown in the drawing), thereby rotating the cam 28 in a clockwise direction due to movement of the eccentric pin 27 within the vertical slot 26 in the piston 12. The initial rotation of the cam 28 in a clockwise direction as just described causes the second high surface 59 of the cam 28 to move into engagement with the cam follower 55 to move the follower 55 and the contact arm 43 outward to disengage the contacts 51 and 53 and thereby open the shunting circuit leaving the starting resistance circuit complete to effect normal starting operation of the compressor at a normal speed due to the starting resistor 3 being in the starting circuit.

On initial starting, after the shunting circuit has been opened, the compressor continues to run on the starting circuit until the pressure of fluid in the reservoir 5a and the chamber 13, connected thereto via the governor 2, is of sufficient degree to move the piston 13 to the extreme left-hand position in opposition to the spring 20 in the recess 19. Movement of the piston 13 to the extreme left-hand position causes the eccentric pin 27 to rotate the cam 28 clockwise to a position in which the first high surface 57 engages the contact follower 54 and moves the follower 54 and the contact arm 42 outward to disengage the contacts 52 and 50 and thereby open the starting resistance circuit to stop the compressor. The fluid pressure at which the compressor is stopped is predetermined by the force of the spring 20 and the buffer spring 22 acting in opposition to the fluid pressure in chamber 13 tending to move the piston to the left. Simultaneously with the opening of the starting resistance circuit, the compressor governor reacts to the predetermined fluid pressure in the reservoir 5a to lap off the pipe 34 such that main reservoir pressure is no longer supplied via pipe 34 and passage 33 to the chamber 13. It should be noted that in the just described initial operation of the compressor the starting resistance was constantly effective to reduce the armature current, a situation that occurs only on the initial starting of the apparatus to cause said apparatus to be in a normal working condition.

With both the compressor circuits opened and the piston 13 in its left-hand position, the apparatus is in an operating condition in which the compressor 5 is stopped and the reservoir 5a is fully charged and available to supply fluid under pressure to an air operated device supplied therefrom (not shown) via a pipe 78 as needed. It should be noted that due to the fact that the build-up of pressure in chamber 13 as supplied from the reservoir 5a is at such a fast rate that the effect of the variable diameter plunger 15 passing through the orifice 16 is unnoticeable except to tend to slow down the build-up of pressure in chamber 13 as the piston 12 nears its extreme left-hand position.

With continued supply of fluid under pressure from the reservoir 5a to the air operated devices supplied therefrom (not shown), the pressure in the reservoir 5a reduces to a low degree sufficient to cause the governor 2 to operate to vent the pipe 34 to atmosphere via a pipe 79. Venting the pipe 34 to atmosphere effects a controlled venting of chamber 13 in a manner hereinafter described in order to properly control the time of closing of the contacts 52 and 53.

The first stage of venting chamber 13 is made with the orifice 16 wide open to cause the rapid reduction in the fluid pressure in chamber 13 and volume 37 via the orifice 16, chamber 30, choke 31, chamber 32, passage 33 and pipe 34 to the atmospheric pipe 79 of the governor 2. The fact that the orifice 16 is wide open also permits the fluid under pressure venting therethrough to clean dirt particles from the orifice. The first rapid reduction of pressure in chamber 13 causes the piston 12 to move slightly to the right to rotate the cam 28 counterclockwise sufficiently to cause the cam follower 54 to engage the first low surface 58 of the cam 28 and thereby permit closing of the contacts 52 and 50 to complete the starting resistance circuit previously described and start the compressor 5. The initial piston movement to the left with the orifice 16 wide open is of only a slight degree, for example, the first 5/16 of an inch of piston travel to permit the contacts 52 and 50 to close.

After the first 5/16 of an inch of piston travel, the large diameter section 18 of the plunger 15 enters the orifice 16 thereby reducing the orifice size from wide open to a very small venting capacity. While the large diameter section 18 is passing through the orifice 16, a piston travel of for example ½ inch, the small venting capacity through the choked orifice causes a reduced rate of venting of chamber 13 and therefore a reduced speed of piston travel to the right, during which time only the starting resistance circuit is complete, thereby allowing the compressor to accelerate to a speed at which it is safe to shunt the starting resistance 3 by closing the shunting circuit.

When the large diameter section 18 of the plunger 15 has passed its entire length, for example ½ inch, through the orifice at the slow rate of piston travel to the right, the small diameter section 17, of for example 7/32 of an inch in length, enters the orifice 16 thereby increasing the venting capacity therethrough and increasing the rate of piston travel to the extreme right-hand position. As the small diameter section 17 enters the orifice 16, the piston 12 moves the eccentric pin 27 and consequently the cam 28 in a counterclockwise direction whereby the second high surface 59 of the cam 28 rotates out of engagement with the cam follower 55 and the second low surface 60 engages the cam follower to permit the contact arm 43 to rotate about the pivot pin 45 and effect engagement or closing of the contacts 51 and 53. With contacts 51 and 53 closed after the time delay created by the slow travel of piston 12 to the right, the aforementioned shunting circuit is completed to shunt the starting resistor 3 and permit the compressor 5 to run with normal full load running current.

The compressor 5 continues to run with normal full load running current until the fluid pressure in the reservoir 5a builds up to the normal predetermined operating pressure, at which time the governor 2 operates in a usual well-known manner to stop the venting of pipe 34 and cause the supply of fluid under main reservoir pressure to said pipe 34. The sudden supply of fluid under main reservoir pressure to the pipe 34 and the connected chamber 13 causes a rapid build-up of pressure in chamber 13 to effect a rapid travel of the piston 12 to the left which in turn causes the shunting circuit to be opened and then the starting resistance circuit to be opened by the action of the cam 28 thereby stopping operation of the compressor.

It can be seen that the feature of having the orifice 16 wide open on initial piston movement to the left, and then passing the plunger 15 through the orifice gives a self-cleaning effect to maintain the orifice 16 clear from dirt or other impurities. The passing of the varied diameter sections of the plunger through the orifice causes the rate of venting of chamber 13 to be varied and consequently the rate of piston travel and counterclockwise rotation of the cam 28 to give the desired time delay of completion of the starting resistance circuit before the starting resistance 3 is shunted. The degree of time delay can be varied by varying the diameters of the plunger 15 or varying the lengths of the different diameter sections to obtain the desired time delay. Variation in the size of the choke 31 will also cause variation in the degree of time delay.

Having now described the invention, what I claim as new and desire to secure by Letters Patent is:

1. A switch device for controlling the starting and stopping of an electric motor, said switch device comprising a starting resistor, a plurality of cooperating switch contacts having one position in which a power circuit for the motor is open, a second position in which the power circuit is established with said resistor in series relation therein, and a third position in which the power circuit is established with the said resistor shunted out, and, a pressure responsive means operative responsively to a supply thereto of fluid at a certain maximum fluid pressure for effecting operation of said switch contacts to open the power circuit and responsively to absence of a supply of fluid pressure thereto for effecting operation of said switch contacts to first establish the power circuit with said resistor therein and thereafter to shunt said resistor.

2. A switch device as claimed in claim 1, further characterized in having means for so controlling the operation of the said switch device that said pressure responsive means contacts are not operated to shunt said resistor until a certain controlled interval of time elapses after the power circuit has been established.

3. A switch device for controlling an electric motor having a motor circuit, said switch device comprising the combination of a resistor adapted to be connected in the motor circuit, switch contact means operative in one closed position to connect said resistor in the motor circuit and in another closed position to shunt said resistor, a chamber adapted to be charged with fluid under pressure therein and to vent fluid under pressure therefrom, a piston device subject to fluid pressure in said chamber and responsive thereto to be movable in one direction to effect operation of said switch contact means to an open position spring means yieldingly opposing the movement of said piston as effected by the fluid under pressure in said chamber and effective when said chamber is vented to cause movement of said piston in an opposite direction to sequentially operate said switch contact means from an open position to said first closed position and then to said second closed, and variable capacity choke means for controlling the rate of venting of fluid under pressure from said chamber, the capacity of said choke means being varied in accordance with movement of the said piston device in said opposite direction.

4. A switch device as claimed in claim 3, in which the said variable capacity choke means comprises an orifice and a variable diameter plunger carried by said piston device and movable coaxially through said orifice.

5. A switch device as claimed in claim 4, in which the said plunger has two coaxially related sections, an outer end section of which is of greater diameter than the other section thereof and is first to move into said orifice upon movement of said piston device in said opposite direction.

6. A switch device comprising a central fixed contact member, two rockable contact members, a rotary cam cooperative with said rockable contact members to rock them into contact with said central contact member in predetermined sequence, and fluid pressure controlled piston means for effecting rotation of said cam.

7. A switch device as claimed in claim 6 and further characterized by a chamber at one side of the piston adapted to be charged with fluid under pressure therein and vent fluid under pressure therefrom, said piston means being movable in one direction responsively to fluid under pressure in said chamber, spring means effective when said chamber is vented to move said piston in an opposite direction, a variable capacity choke means, the capacity of which is varied by movement of the said piston means, said choke means controlling the rate of venting of fluid under pressure from said chamber to correspondingly vary the rate of movement of the piston means in said opposite direction and thereby the rate of rotation of said cam.

8. In combination, a switch device as claimed in claim 6 and further characterized by a chamber at one side of the piston chargeable with fluid under pressure and from which fluid may be vented, said piston means being movable in one direction responsively to fluid under pressure in said chamber, spring means effective when said chamber is vented to move said piston in an opposite direction, a variable capacity choke means, the capacity of which is varied by movement of the said piston means, said choke means controlling the rate of venting of fluid under pressure from said chamber to correspondingly vary the rate of movement of said piston means and thereby the rate of rotation of said cam, said chamber being chargeable with fluid under pressure to a certain maximum fluid pressure to effect movement of said piston means in said one direction being effective to cause corresponding movement of the rotary cam in a direction to position both of the said rockable contact members out of contact with the said central contact member, and movement of the said piston means in said opposite direction responsively to venting of said chamber to effect movement of said rotary cam to cause rocking of the said rockable contact members sequentially into contact with the said central contact member.

9. A switch device as claimed in claim 7 further characterized in that the variable capacity choke means comprises an orifice through which venting of fluid under pressure from the said chamber occurs, and a plunger of variable diameter carried on said piston means and movable coaxially through said orifice.

10. A switch device comprising a central fixed contact member, two rockable contact members, a rotary cam rotatably cooperative with said rockable contact members to rock first one and then the other into contact with said central contact member in a predetermined sequence, and fluid pressure controlled piston means for effecting rotation of said cam, variable capacity choke means comprising an orifice through which venting of fluid under pressure from a chamber at one side of the piston means occurs, the capacity of said choke means being varied to correspondingly vary the rate of movement of the piston means and thereby the rate of rotation of said cam, and a plunger having two coaxially related outer and inner sections carried on said piston means and movable coaxially through said orifice to vary the capacity of said choke means, the outer section being of greater diameter than the inner section and operative upon entry thereof into said orifice to restrict venting of fluid under pressure therethrough as the said cam effects rocking of the said one rockable contact member into contact with the said central contact member, and the inner section being operative thereafter upon entry thereof into said orifice to reduce the restriction of venting of fluid under pressure therethrough as the said cam effects rocking of the said other rockable contact member into contact with the said central contact member.

11. A switch device as claimed in claim 7, further characterized in that the variable capacity choke means comprises a choke plate having an orifice through which venting of fluid under pressure from said chamber at one side of the said piston means occurs, a plunger of variable diameter carried on said piston means and movable coaxially through said orifice, and means frictionally retaining said choke plate in position to enable movement of the choke plate in its own plane responsively to movement of the plunger through the orifice in the said choke plate to effect proper alignment of the orifice with the said plunger.

12. A switch device as claimed in claim 8, further characterized in that said plunger has two coaxially related outer and inner sections, the outer end section being of greater diameter than the inner section, said plunger being completely out of said orifice when the chamber at the one side of the piston is fully charged with fluid under pressure, said piston means being operable responsively to venting of the fluid under pressure from the fully charged chamber via the open orifice, to move in one direction to first cause entry of said outer end section of said plunger into said orifice to restrict venting of fluid under pressure therethrough, and thereafter cause entry of said inner end section of said plunger into said orifice to reduce the restriction of venting of fluid under pressure therethrough.

References Cited in the file of this patent

UNITED STATES PATENTS

| | | |
|---|---|---|
| 1,813,914 | Corcoran | July 14, 1931 |
| 2,180,856 | Aikman | Nov. 21, 1939 |
| 2,443,952 | Brandstrom | Mar. 14, 1944 |
| 2,522,596 | Bevins | Sept. 19, 1950 |
| 2,646,205 | Rosenschold | July 21, 1953 |
| 2,810,800 | Hasselhorn | Oct. 22, 1957 |

UNITED STATES PATENT OFFICE
CERTIFICATE OF CORRECTION

Patent No. 2,986,617                       May 30, 1961

Frank W. Shirey

It is hereby certified that error appears in the above numbered patent requiring correction and that the said Letters Patent should read as corrected below.

Column 6, line 5, for "switch device" read -- pressure responsive means --; lines 5 and 6, for "pressure responsive means" read -- switch --; same column 6, line 26, after "closed" insert -- position --.

Signed and sealed this 24th day of October 1961.

(SEAL)
Attest:

ERNEST W. SWIDER
Attesting Officer

DAVID L. LADD
Commissioner of Patents
USCOMM-DC